United States Patent [19]

Pivotto et al.

[11] Patent Number: 4,822,858
[45] Date of Patent: Apr. 18, 1989

[54] PROCESS FOR THE PREPARATION OF POLYBUTADIENE GRAFTED WITH STYRENE AND ACRYLONITRILE AND HAVING A VERY LOW END CONTENT OF UNREACTED RESIDUAL MONOMERS

[75] Inventors: Bruno Pivotto; Gualtiero Ferri; Franco Campana, all of Ferrara, Italy

[73] Assignee: Enichem Tecnoresine S.p.A, Palermo, Italy

[21] Appl. No.: 866,146

[22] Filed: May 22, 1986

[30] Foreign Application Priority Data

May 24, 1985 [IT] Italy .................................. 20891 A/85

[51] Int. Cl.$^4$ ......................... C08F 279/04; C08F 2/22
[52] U.S. Cl. ..................................... 525/246; 525/247; 525/252; 525/261; 525/264; 525/265; 525/316
[58] Field of Search ............... 525/316, 247, 246, 265, 525/252, 261, 264; 526/86, 87

[56] References Cited

U.S. PATENT DOCUMENTS

| | | | |
|---|---|---|---|
| 3,991,136 | 11/1976 | Dalton et al. | 525/316 |
| 4,200,593 | 4/1980 | van der Loos et al. | 526/86 |
| 4,294,946 | 10/1981 | Minematsu et al. | 526/342 |
| 4,404,338 | 9/1983 | De Toffol et al. | 525/242 |

*Primary Examiner*—Wilbert J. Briggs, Sr.
*Attorney, Agent, or Firm*—Hedman, Gibson, Costigan & Hoare

[57] ABSTRACT

During the reaction of grafting of styrene and acrylonitrile to polybutadiene, the conversion of the graft monomers is increased from the values of 92÷94% usually obtained, to values very close to 98%, by carrying out a redox-type reaction additional to that provided by the process, in the presence of an additional aliquot of acrylonitrile and of catalytic system.

9 Claims, No Drawings

PROCESS FOR THE PREPARATION OF POLYBUTADIENE GRAFTED WITH STYRENE AND ACRYLONITRILE AND HAVING A VERY LOW END CONTENT OF UNREACTED RESIDUAL MONOMERS

The present invention relates to a process for the preparation of a graft polymer by graft copolymerization of a mixture of acrylonitrile and styrene on polybutadiene, with high conversion of the graft monomers, such as to allow the step of stripping of the unreacted amount of said graft monomers to be eliminated, at the same time leaving to the end product, unchanged, its physical-mechanical properties, and its characteristics of appearance, suitable to the subsequent applications of the product, for example for forming blends with styrene-acrylonitrile copolymers in the production of ABS resins.

More particularly, the present invention relates to a process for the preparation of polybutadiene grafted with a mixture of styrene and acrylonitrile, having a very low content of unreacted residual monomers, which process essentially provides the carrying out of a redox-type reaction additional to that provided by the conventional process, in the presence of an additional aliquot of acrylonitrile and catalytic system.

Traditionally, in the reaction of grafting of the mixture of styrene and acrylonitrile to polybutadiene, the end conversion of the graft monomers reaches values not higher than 94%. It is known that the presence of unpolymerized monomers has a negative impact on the thermal properties of the copolymers obtained and on the appearance of the subsequent manufactured articles. Moreover, the unpolymerized monomers tend to be released during the following steps of product processing such as, e.g., the coagulation, the filtering, the high-temperature blending, or the moulding.

The possibility is known as well, from U.S. Pat. No. 4,404,338 of lowering the content of residual end monomers during the proceeding of a process for the copolymerization of vinylaromatic monomers with ethylenically unsaturated nitriles.

The patent reference relates indeed to a process for the preparation of vinyl-aromatic copolymers with ethylenically unsaturated nitriles, having a very low amount of unreacted residual monomers, by polymerization in aqueous dispersion, characterized in that, in the end step of the polymerization process, to the aqueous dispersion, also containing a compound able to release free radicals, a certain aliquot is added of a comonomer particularly reactive towards the unreacted monomers. This contemporaneous presence allows the amount of unreacted monomers to be drastically reduced to negligible values, without altering the general characteristics of the end polymer.

But, of course, one skilled in the art could expect that in a copolymerization reaction, the addition of one of the comonomers (and the above cited patent lets one think to a kind of equivalence between the use of one of comonomers and a third comonomer highly reactive towards the residual monomers) would cause a decrease of the unreacted residual monomers, due to the continuing of the same copolymerization reaction, so much that the Applicant suggests that, during the progress of the process in question, no side crosslinking reactions between the monomers and the polymer occur.

It was on the contrary not foreseeable, nor does the teaching of the above cited patent make it obvious, that it could be possible to reduce to a considerable extent the amount of residual unreacted monomers in the graft copolymerization of a mixture of acrylonitrile and styrene to a polybutadiene matrix, without at the same time reducing the yields of grafting to the same matrix.

In fact, it has been surprisingly found, and is the object of the present invention, that during the reaction of grafting of styrene and acrylonitrile to polybutadiene, it is possible to increase the conversion of the graft monomers up to values very close to 98%, and higher, by a process according to which the polymerization is provided of a redox-type reaction additional to that provided by the processes of the prior art, in the presence of an additional aliquot acrylonitrile and of catalytic system.

It is known that the reaction of grafting of styrene and acrylonitrile to polybutadiene is carried out by polymerizing the monomers, namely styrene and acrylonitrile, in an aqueous polybutabiene latex, in the following percentages:

from 10% to 90% by weight of acrylonitrile-styrene mixture containing from 50% to 90% by weight of styrene;

from 90% to 10% by weight of polybutadiene; in the presence of both water-soluble and oil-soluble catalysts and emulsifiers.

Examples of oil-soluble catalysts are the organic peroxides or hydroperoxides, such as di-tert-butyl-peroxide, benzoyl-peroxide, lauroyl-peroxide, di-cumyl-peroxide, tert-butyl-peroxide, tert-butyl-hydroperoxide, cumene-hydroperoxide, di-isopropylbenzene-hydroperoxide, methyl-cyclohexyl-hydroperoxide.

Examples of water-soluble catalysts are the persalts of potassium, sodium, ammonium, such as persulphates, perborates, peracetates, percarbonates, alkali metal peroxides and hydrogen peroxide, either alone, or activated by reducing agents.

The said catalysts are activated by a reducing agent, so as to form a redox system. Polymerization activators are compound of low-valence sulphur, such as sodium formaldehyde-sulphoxylate, sodium bisulphite or pyrosulphite, dextrose, organic bases and salts or complexes of ions of iron or of such low-valence transition metals as Co, Ni, Cu; above all, the system Fe-EDTA/Rodite (Rodite=sodium-formaldehyde sulphoxylate) is preferred.

The above mentioned oil-soluble catalyst is used in amounts comprised within the range of from 0.05 to 0.50% by weight relatively to the mixtures of monomers, and the activator is added in percentages ranging from 0.03 to 0.3% by weight, always relatively to the weight of monomers.

The reaction is carried out at a temperature comprised within the range of from 60° to 95° C., generally at 70° C. in the presence of an emulsifier agent selected from alkali-metal or ammonium salts of fatty acids, such as lauric acid, oleic acid, and stearic acid; disproportionated resin acids, or sulphonated fatty acids, alkyl-arylsulphonic acids or esters, esters of sulphuric acid or of phosphoric acid, in particular sodium or potassium alkyl-sulphonates in synergistic mixture with a dispersant of the type of condensed naphthalene-sulphonates.

According to the "high-conversion" process of the present invention, when the conversion of grafting of monomer acrylonitrile and styrene to polybutadiene has reached values higher than 75%, and is preferably at about 94%, additional amounts of acrylonitrile and of catalytic system are added.

In detail, when the graft conversion has reached the above indicated values, the following further aliquots are added:

an additional amount of acrylonitrile of from 0.1 to 3% by weight as referred to the monomers fed, preferably of from 1.3 to 1.5%;

an additional amount of polymerization catalyst of from 0.02 to 0.4% by weight as referred to the monomers fed, preferably of from 0.03 to 0.05%;

an additional amount of polymerization activator of from 0.02 to 0.4% by weight as referred to the monomers fed, preferably of from 0.04 to 0.06%.

In the end step of the graft copolymerization, which corresponds to the innovating aspect according to the present invention, the temperature is maintained at higher values than those of the initial step, it being however generally comprised within the range of from 80° to 95° C.

The end conversion of the graft monomers reaches values higher than 96% and, in some cases, close to or higher than 98%.

EXAMPLE 1

GRAFTING BY TRADITIONAL TECHNOLOGY (PB/SAN=52.4/47.6)

PB=polybutadiene; SAN=styrene-acrylonitrile 8691 g of latex at 35% by weight of polybutadiene having particle size comprised within the range of from 600 to 8000 Å is charged in a reactor and reacted with a mixture formed by 2001 g of styrene and 760 g of acrylonitrile.

The redox-type catalyst is constituted by 5.8 g of cumene hydroperoxide, 4.4 g of catalytic activator (Fe-EDTA) and 8.7 g of Rodite.

The emulsion is stabilized with 160 g of surfactants constituted by sodium alkanesulphonates and/or sodium and potassium salts of disproportionated resin acids.

The reaction temperature is of 70° C.

The feed of the graft monomers is carried out in continuous during a time of 3 hours and 45 minutes. The catalytic system is fed over a time of 4 hours and 45 minutes, at the end of which time period, a "stay" step is carried out at the temperature of 70° C., for a time of 1 hour.

Altogether, the total graft reaction time is of 5 hours and 45 minutes. In Table 1 the content of residual monomers, as determined by gas-chromatography, in the grafted polybutadiene latex is reported.

In Tables 2 and 3 the chemical-physical and mechanical characteristics, measured on ABS resins obtained by the addition of different levels of grafted polybutadiene are reported.

EXAMPLE 1 BIS

GRAFTING BY HIGH-CONVERSION (SUPER-REDOX) METHODOLOGY

Example 1 is repeated with the same initial aliquots of monomer and catalytic system, by introducing the following operative and formulation variants:

a. The feed of graft monomers (styrene and acrylonitrile is always carried out over a time of 3 hours and 45 minutes.

b. the catalytic system is fed over 4 hours and 15 minutes;

c. three hours later than the beginning of the feed of graft monomers, an additional aliquot (38.6 g) of acrylonitrile, corresponding to 1.4% by weight relatively to the total charged monomers, is fed as one single portion;

d. at the end of the feed of the catalytic system (CHP, Fe-EDTA, Rodite), i.e., after 4 hours and 15 minutes from the beginning of the graft reaction, an additional aliquot of catalytic system is fed, constituted by:

Rodite: 2,9 g;

Fe-EDTA: 1.47 g;

CHP: 1.94 g. Such feed is carried out in continuous for a time of 45 minutes;

e. additional stay of 15 minutes of the grafted polymer at the end of the feed of catalytic system;

f. the reaction temperature is of 80° C.;

g. the stabilization of the latex is carried out with one single anionic surfactant, such as a sodium alkanesulphonate obtained by the chlorosulphonation of n-paraffins.

The end content of residual monomers is reported in Table 1. Tables 2 and 3 report the characteristics measured on related ABS resins.

EXAMPLE 2

(PB/SAN=40/60)

6631 g of latex at 35% by weight of polybutadiene having particle size comprised within the range of from 600 to 8000 Å is charged in a reactor and reacted with a mixture formed by 2523 g of monomer styrene and 957 g of monomer acrylonitrile.

The redox-type catalyst is constituted by 5.8 g of cumene hydroperoxide, 4.4 g of catalytic activator (Fe-EDTA) and 8.7 g of Rodite.

The emulsion is stabilized with 174 g of surfactants; the reaction temperature is of 70° C. The other operating conditions are the same as described in Example 1.

The end content of residual monomers is evidenced in Table 1, and in Tables 2 and 3 the chemical-physical and physical-mechanical characteristics of related ABS resins are reported.

EXAMPLE 2 BIS

The Example 2 and the "Super-redox" methodology as described in Example 1 bis are followed, additional aliquots of 1.4% by weight (48.72 g) of acrylonitrile, and of catalytic system, in the same amount as described in Example 1 bis, being added.

The end data are reported in the above mentioned Tables.

EXAMPLE 3

(PB/SAN=40/60)

9611 g of latex at 35% by weight of polybutadiene having particle size comprised within the range of from 600 to 8000 Å is charged in a reactor and reacted with a mixture formed by 1682 g of styrene and 638 g of acrylonitrile.

The redox-type catalyst is constituted by 5.2 g of cumene hydroperoxide, 3.72 g of catalytic activator (Fe-EDTA) and 6.96 g of Rodite.

The emulsion is stabilized with 127.7 g of surfactants and the reaction temperature is maintained at 70° C.

All the other operating conditions are the same as described in Example 1.

The end content of residual monomers in polybutadiene is evidenced in Table 1.

As above, in Tables 2 and 3 the chemical-physical and physical-mechanical characteristics, measured on related ABS resins, are reported in detail.

EXAMPLE 3 BIS

The "Super-redox" methodology of Example 1 bis has been followed, and namely using:

an additional aliquot of 1.4% by weight (32.48 g) of acrylonitrile, as referred to the graft monomers;

additional catalytic system, constituted by 2.32 g of Rodite, 1,25 g of Fe-EDTA and 1.73 g of cumene hydroperoxide;

temperature of 80° C.

The results are reported in the Tables.

EXAMPLE 4

(PB/SAN=65/35)

8340 g of latex at 35% by weight of polybutadiene having particle size comprised within the range of from 600 to 8000 Å is charged in a reactor and reacted with a mixture formed by 1142 g of monomer styrene and 433 g of monomer acrylonitrile.

The redox-type catalyst is constituted by 5.8 g of cumene hydroperoxide, 4.4 g of catalytic activator (Fe-EDTA) and 8.7 g of Rodite.

The emulsion is stabilized with 116 g of surfactants and the reaction temperature is maintained at 70° C.

For the other operating parameters, see are Example 1; the results are reported in Tables 1, 2 and 3. Example 4 bis.

The "Super-redox" methodology of Example 1 bis is repeated, with the following particularities:

additional aliquot of 22 g of acrylonitrile, equivalent to 1.4% by weight, as referred to the graft monomers;

additional aliquot of catalytic system, constituted by 8.7 g of Rodite, 4.4 g of Fe-EDTA and 5.8 g of cumene hydroperoxide;

the reaction temperature is always of 80° C.

The end results are reported, according to as many times stated in the foregoing, in the above mentioned Tables.

TABLE 1

RESIDUAL MONOMERS AT THE END OF THE REACTION OF POLYBUTADIENE GRAFTING WITH STYRENE AND ACRYLONITRILE

| Example No. | PB/SAN Grafting Ratio | Acrylonitrile (ppm) | Styrene (ppm) | Butadiene Dimer (ppm) | Conversion % |
|---|---|---|---|---|---|
| 1 | 52.4/47.6 | 2700 | 7700 | 1960 | 92.6 |
| 1 bis | 52.4/47.6 | 650 | 3600 | 2030 | 97.5 |
| 2 | 40/60 | 3630 | 7280 | 1760 | 94.2 |
| 2 bis | 40/60 | 550 | 3400 | 1780 | 98.2 |
| 3 | 60/40 | 1500 | 8600 | 1500 | 94.2 |
| 3 bis | 60/40 | 500 | 2600 | 1550 | 97.3 |
| 4 | 65/35 | 1800 | 7950 | 2100 | 90.1 |
| 4 bis | 65/35 | 580 | 4010 | 2400 | 96.5 |

TABLE 2

CHEMICAL-PHYSICAL CHARACTERISTICS OF POLYBUTADIENE GRAFTED WITH STYRENE AND ACRYLONITRILE

| Example No. | Swelling (%) | Thermal Oxidation (hours) | Free Gum (%) | Soaps (%) | Acetonic Residue (%) | Free SAN % | $[\eta]$ Free SAN (dl/g) | PB/SAN Ratio |
|---|---|---|---|---|---|---|---|---|
| 1 | 225 | over 6 | 1.6 | 1.8 | 90 | 6.6 | 0.53 | 52.4/47.6 |
| 1 bis | 200 | over 6 | 1.5 | 1.8 | 91 | 5.7 | 0.55 | 52.4/47.6 |
| 2 | 296 | over 6 | 1.3 | 1.6 | 86 | 11 | 0.41 | 40/60 |
| 2 bis | 260 | over 6 | 1.3 | 1.6 | 89 | 8.1 | 0.43 | 40/60 |
| 3 | 248 | over 6 | 1.6 | 2 | 90 | 6.6 | 0.63 | 60/40 |
| 3 bis | 223 | over 6 | 1.6 | 2.1 | 90.3 | 6.0 | 0.75 | 60/40 |
| 4 | 321 | over 6 | 1.9 | 2.2 | 91.8 | 4.1 | 0.52 | 65/35 |
| 4 bis | 298 | over 6 | 1.8 | 2.1 | 92.1 | 4 | 0.54 | 65/35 |

TABLE 3

| Example No. | Pe/SAN Ratio | FLUIDITY AT 230° C. (cm) Polybutadiene in the blend (%) | | | RESILIENCE D1/4 +23° C. Polybutadiene in the blend (%) | | | HARDNESS "R" Polybutadiene in the blend (%) | | | VICAT (5 kg) 120° C./h Polybutadiene in the blend (%) | | | "GLOSS" | |
|---|---|---|---|---|---|---|---|---|---|---|---|---|---|---|---|
| | | 10 | 17 | 25 | 10 | 17 | 25 | 10 | 17 | 25 | 10 | 17 | 25 | 5 cm F. | 2 cm F. |
| | | | | | | | | | | | | | | 17 | |
| 1 | 57.4/47.6 | 36 | 32 | 27 | 11.6 | 19.7 | 30.5 | 117 | 111 | 99 | 100 | 99 | 97 | 70 | 61 |
| 1 bis | 52.4/47.6 | 36 | 31 | 28 | 11.8 | 20.2 | 29.7 | 118 | 111 | 100 | 100.5 | 99.5 | 98 | 75 | 65 |
| 2 | 40/60 | 34 | 30 | 28 | 10.7 | 19.3 | 28.3 | 117 | 112 | 100 | 100 | 99 | 96 | 71 | 63 |
| 2 bis | 40/60 | 35 | 30 | 29 | 10.5 | 21 | 29.5 | 117 | 111 | 99 | 100.5 | 99 | 97 | 80 | 65 |
| 3 | 60/40 | 35 | 30.5 | 26.5 | 8.8 | 19.6 | 28.4 | 116.5 | 108 | 99 | 101.5 | 100 | 97 | 73 | 62 |
| 3 bis | 60/40 | 37 | 30.5 | 26.5 | 8.9 | 20.1 | 29.7 | 116 | 109 | 99 | 102 | 101 | 99 | 76 | 68 |
| 4 | 65/35 | 35 | 30 | 26 | 7.2 | 19.7 | 27.6 | 117 | 111 | 100 | 101 | 100 | 96 | 68 | 54 |
| 4 bis | 65/35 | 36 | 29 | 27 | 7.3 | 20.5 | 29 | 116 | 111 | 99 | 100.5 | 100 | 98 | 76 | 58 |

We claim:

1. An emulsion polymerization process for the preparation of polybutadiene grafted with styrene and acrylonitrile monomers, having a very low end content of unreacted residual monomers, said process comprising conducting the graft copolymerization reaction with a mixture of acrylonitrile and styrene in the presence of a catalyst selected from cumene hydroperoxide, sodium persulfate, potassium persulfate, ammonium persulfate, di-isopropylbenzene hydroperoxide, and tert.butylperoxide, and a catalytic activator selected from dextrose, organic bases, salts and complexes containing iron ions, said acrylonitrile, styrene, catalyst and activator being continuously added to the polybutadiene, and wherein in the latter stages of the reaction but prior to the time when all of the styrene and acrylonitrile monomers have been added, there is added to the reaction an additional aliquot of acrylonitrile in an amount of from 0.1 to 3% by weight, and after the addition of the catalyst and activator is complete, there are added an additional aliquot of polymerization catalyst in an amount of from 0.02 to 0.4% by weight and an additional aliquot of polymerization activator in an amount of from 0.02 to 0.6% by weight, based on the weight of the monomers fed to the reaction.

2. The process of claim 1 wherein the additional aliquots of the polymerization catalyst and the polymerization activator are added to the reaction after the addition of the additional aliquot of acrylonitrile.

3. The process of claim 2 wherein the additional aliquots of the polymerization catalyst and the polymerization activator are added at the conclusion of the introduction of the polymerization catalyst to the reaction.

4. The process of claim 2 wherein the additional aliquots of polymerization catalyst and polymerization activator are added together to the reaction.

5. The process of claim 1, wherein the complex containing iron ions is Iron-EDTA.

6. The process of claim 1, wherein the additional amounts of acrylonitrile, polymerization catalyst and polymerization activator are added to the reaction mixture in the following amounts:
acrylonitrile from 1.3 to 1.5% by weight;
catalyst from 0.03 to 0.05% by weight;
activator from 0.04 to 0.06% by weight.

7. The process of claim 1, wherein the mixture of styrene and acrylonitrile is present in an amount of 10 to 90% by weight, said mixture containing 50 to 90% by weight of styrene; and polybutadiene is present in an amount of 90 to 10% by weight.

8. The process of claim 1, wherein the reaction is conducted at a temperature of from 60° to 95° C.

9. The process of claim 7, wherein the addition of the additional amounts of acrylonitrile, polymerization catalyst and polymerization activator is conducted at a temperature higher than the initial reaction temperature and within the range of from 80° to 96° C.

* * * * *